Jan. 16, 1962 W. H. DU SHANE 3,017,200
HITCH DEVICES WITH DETACHABLE GUIDE MEANS
Original Filed Sept. 9, 1955

INVENTOR.
WALLACE H. DU SHANE
BY
ATTORNEYS

United States Patent Office 3,017,200
Patented Jan. 16, 1962

3,017,200
HITCH DEVICES WITH DETACHABLE
GUIDE MEANS
Wallace H. Du Shane, Waterloo, Iowa, assignor, by mesne assignments, to Deere & Company, a corporation of Delaware
Original application Sept. 9, 1955, Ser. No. 533,462, now Patent No. 2,912,257, dated Nov. 10, 1959. Divided and this application Dec. 16, 1957, Ser. No. 703,133
13 Claims. (Cl. 280—477)

This application is a division of my copending application (A-2591), Serial No. 533,462, filed September 9, 1955, for Hitch Devices, now U.S. Patent 2,912,257, issued November 10, 1959.

The present invention relates generally to agricultural implements and more particularly to quick attachable hitch devices adapted to be incorporated in the connection between a tractor and implement.

The object and general nature of the present invention is the provision of a new and improved quick detachable connection adapted for incorporation in implement hitch means whereby an implement is connected with the tractor to be supported or propelled thereby. More particularly, it is a feature of this invention to provide a quick attachable hitch adapted for tractors having a pair of laterally spaced apart hitch links that are carried by the tractor and connected with the tractor power lift to be raised or lowered thereby, whereby, according to the principles of the present invention, the tractor may simply be backed into the implement and automatically connected therewith.

More specifically, an important feature of this invention is the provision of means associated with the implement and acting to guide the implement-engaging links when the tractor is backed into position relative to the implement to connect the latter with the tractor.

Still further, another feature of this invention is the provision of new and improved link-receiving means easily and quickly attached to or disconnected from an associated implement and serving to guide self-locking tractor-carried hitch links into the proper position.

These and other objects and advantages of the present invention will be apparent to those skilled in the art after a consideration of the following detailed description, taken in conjunction with the accompanying drawings, in which.

Figure 1:
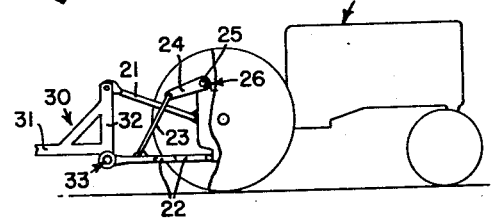
FIG. 1 is a fragmentary side view illustrating a tractor and implement outfit in which the hitch means connecting the implement and tractor incorporates quick detachable connections constructed according to the principles of the present invention.

Referring first to FIG. 1, the reference numeral 20 indicates a tractor that is more or less of conventional construction, so far as the present invention is concerned, such as one employing the well known three point hitch system, which includes an upper or compression link 21 and a pair of lower draft or tension links 22, said links being connected with the tractor for both vertical and horizontal swinging, the lower links 22 being connected by lift links 23 with lift arms 24 fixed to a rockshaft 25 that forms a part of the power lift system 26 of the tractor 20.

The implement is indicated by the reference numeral 30 and, for purposes of illustration, has been shown as including a frame 31 having a forward upwardly extending mast section 32 and, at the lower portion of the mast section 32, a cross shaft 33 the ends of which are arranged as link-receiving attachment studs 34. The implement 30 represents any one of a number of different implements with which the tractor 20 may be connected, and according to the principles of the invention shown and claimed in my above-identified parent application means is provided for automatically coupling the rear portions of the draft links 22 to the implement studs 34 merely by backing the tractor into position relative to the implement. The guiding means by which the rear ends of the draft links 22 of the tractor can be quickly and automatically connected with the implement 30 forms the principal portion of the present invention and will now be described in detail.

The coupling jaw means is disclosed in detail and claimed in my parent application mentioned above and hence it will be sufficient for purposes of the present disclosure to note that each link 22 is provided at its rear end with a pair of jaws 41 and 42 that are optionally held in open or closed position by latch means, best shown in my aforesaid parent application. The jaws 41 and 42 are pivotally interconnected by a pin (not shown) that is slidable in a slot 44 formed in the side wall of the rear portion of the associated link 22. Normally, the jaws 41 and 42 are held in open or spaced apart position when the tractor is backed to bring the links into connection with the shaft 33 of the implement 30.

The crossbar 33, which forms a part of or is secured to the implement to facilitate its connection to the tractor, is provided at each end with an attaching stud 34. Each stud includes a tapered section 101 that leads from the main body of the crossbar 33 to a reduced section 102, there being a shoulder 103 between the reduced section 102 and the adjacent tapered portion 101. For receiving a tractor draft link, the reduced section 102 carries a spherical bearing member 104 that normally lies against the shoulder 103. The laterally outer face of the bearing member 104 is recessed annularly, as at 106, and the reduced section 102 extends laterally outwardly beyond the bearing member 104 and is provided with a cross bore 107 in which a pin 108 is adapted to be disposed. The laterally outer end of the reduced section 102 is tapered, as at 109.

Figure 2:
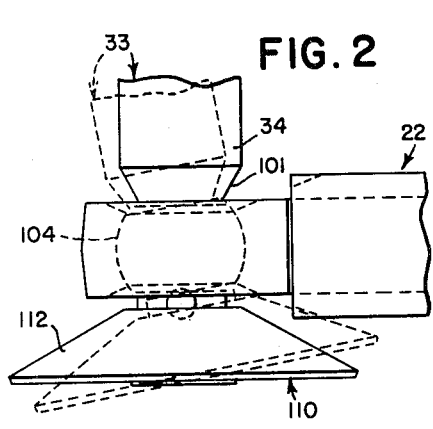
FIG. 2 is an enlarged fragmentary plan view of the rear portion of a quick attachable jaw construction and the associated portion of an implement attaching stud, incorporating the principles of the present invention, the stud being shown in two different positions, one in dotted lines, in order to illustrate the guiding function of the conical washers associated with the implement stud.
Figure 3:
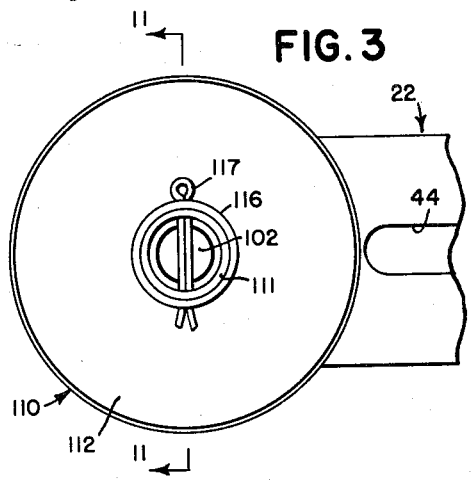
FIG. 3 is a side view of the parts shown in FIG. 2.
Figure 4:
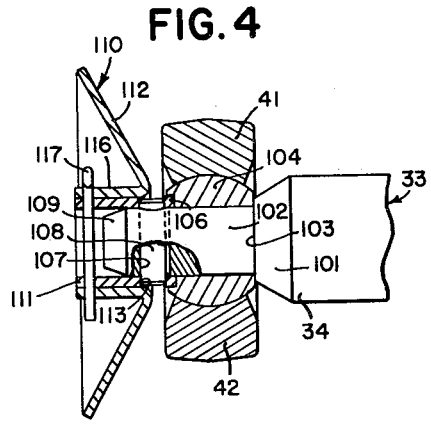
FIG. 4 is a sectional view taken generally along the line 11—11 of FIG. 3.

A guide member 110 is mounted on the stud section 102 laterally outwardly of the bearing member 104 and, as shown in FIGS. 2-4, comprises a conoidal member having a cylindrical hub section 111 and a conical or outwardly flaring guide section 112 the latter forming the principal guiding means of the member 110. The hub section 111 is cylindrical and is provided at its inner end with an opening 113 to receive the pin 108, the inner end of the hub section being disposed in the annular groove or recess 106 in the bearing member 104. The central portion of the conical guide section 112 is provided with an inner cylindrical portion 116, the axially outer part of the section 116 and the axially outer part of the hub section 111 being apertured to receive a cotter pin 117 or other attaching means. As will be seen from FIG. 4, the axially inner portion of the guide section 112 overlies the pin 108 when the parts are assembled, thus holding the pin 108 against displacement. By removing the cotter pin 117 the conical guide section 112 may be slipped off the hub section 111, and then the pin 108 may be removed from the hub section 111 to free the latter, thus freeing the bearing member 104. It will be understood that this is not done except to replace broken or worn parts. Each end of the crossbar 33 carries a construction like that just described.

When the tractor, carrying the links 22 and the two sets of jaws 41 and 42, is backed into the implement, if there should be some lateral displacement or misalignment, the conical guide sections 112 will act to guide the links 22, which are laterally swingable, into a position to carry the bearing members 104, which form a part of the studs 34, into the open jaws 41 and 42. Further backing of the tractor toward the implement will cause the bearing members 104 to press against the intermediate portions of the jaws 41 and 42 to move the jaws into the links 22, which movement automatically causes the jaws to close about the bearing members 104, as set forth in detail in the above identified parent application. This action continues until the jaws 41 and 42 are fully closed. After the rear end of the upper link 21 (FIG. 1) is connected with the upper portion of the implement mast section 32, which may be done by any suitable means, the implement is then connected in draft transmitting relation with the tractor 20.

Figure 5:
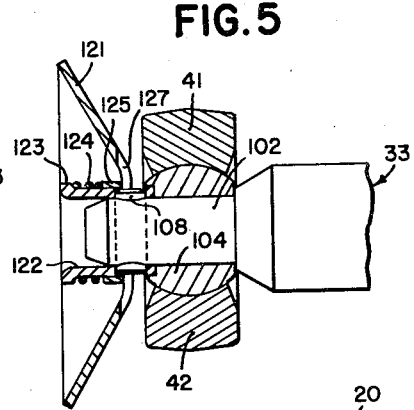
FIG. 5 is a view similar to FIG. 4, showing a modified form of this invention.

A modified form of the guide means of the present invention is shown in FIG. 5. In this form, the guide member includes an outwardly flaring or conical guide section 121 and a hub section 122. The conical guide section is mounted for axial movement on the cylindrical hub section 122, the latter having a radially outwardly extending shoulder 123 against which a coiled spring 124 is disposed. An inner ring 125, which forms a part of the member 121, receives the inner end of the spring 124. The inner end of the cylindrical section 122 is apertured, as described above, to receive the attaching or securing pin 108, and opposite portions of the conical member 121 is provided with openings 127 to permit the application of the pin 108 after which the spring 124 forces the ring member 125 over the ends of the pin 108 to hold the latter in position.

Figure 6:
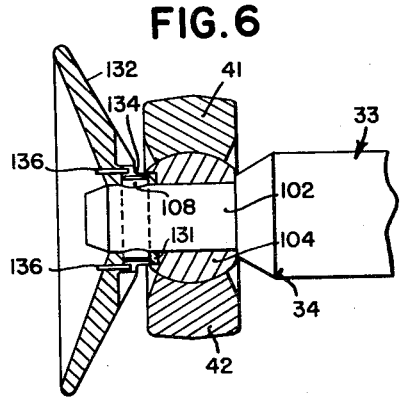
FIG. 6 is a view also similar to FIG. 4, showing another modified form of guide means of this invention.

A further form of guide means is shown in FIG. 6. In this form the cylindrical hub section 131 and conical guide section 132 form integral portions of a single part, which may be a casting, forging or the like, the cylindrical section 131 having openings 134 to receive a cross pin 108, which is held in place by small pins 136 that are inserted through openings in the members 131, 132 after the latter have been mounted on the outer end of the stud reduced section 102 and the pin 108 placed in the aligned openings in the cylindrical sections 131 and the reduced portion 102 of the stud 34.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. An implement hitch guide means for guiding a self-locking link onto a link attachment bearing mounted on a stud, an apertured portion of which extends beyond said bearing, said guide means comprising a conoidal guide section, an apertured cylindrical hub section, the peripheral portion of said conoidal section flaring outwardly of said bearing when the guide means is mounted on said stud, pin means extending through said apertured hub section and through the apertured portion of said stud for holding the guide means on said stud, and means shiftable on said hub section into a position overlying said pin means to hold the latter in said stud.

2. An implement hitch guide means for guiding a self-locking link onto a link attachment bearing mounted on a stud, said stud having a shoulder against which said bearing is adapted to abut and an apertured portion extending outwardly beyond said bearing at the side thereof opposite said shoulder, said guide means comprising a conoidal guide section, an apertured cylindrical hub section, the peripheral portion of said conoidal guide section flaring outwardly of said bearing when the guide means is mounted on said stud, and pin means extending through said apertured hub section and through the apertured portion of said stud for holding the guide means and said bearing on said stud.

3. An implement-tractor connection comprising the combination of a stud having a link-receiving section apertured adjacent one end, guide means including a cylindrical hub section and an outwardly flaring guide section, and attaching means extending through the hub section and the apertured portion of said stud to hold the guide means in position on the stud adjacent the link-receiving section thereof.

4. The invention set forth in claim 3, further characterized by said guide and hub sections being separate parts and said guide section being axially shiftable on said hub section, and means holding the guide section on the hub section in a position overlying said attaching means.

5. The invention set forth in claim 4, further characterized by said guide section having a cylindrical portion overlying said hub section, and said holding means including a part interconnecting said cylindrical portion and said hub section.

6. The invention set forth in claim 4, further characterized by said guide section having a cylindrical portion overlying said hub section, and said holding means including a spring yieldably holding the guide section in embracing relation relative to said attaching means.

7. The invention set forth in claim 3, further characterized by said guide section and said hub section forming portions of a single part, the latter being apertured to receive said attaching means.

8. An implement-tractor connection comprising the combination of a stud having a link-receiving section apertured adjacent one end, a guide member having a cylindrical hub section and an outwardly flaring guide section, attaching means extending through the hub section and the apertured portion of said stud to hold the guide member in position on the stud adjacent the link-receiving section thereof, said guide section and said hub section being separate parts, one slidable on the other, and means holding said sections together when mounted on said stud.

9. An implement-tractor connection comprising the combination of a stud having a link-receiving section apertured adjacent one end, a guide member having a cylindrical hub section and an outwardly flaring guide section, attaching means extending through the hub section and the apertured portion of said stud to hold the guide member in position on the stud adjacent the link-receiving section thereof, said guide section and said hub section being separate parts, one slidable on the other and said one part being the guide section and the latter being movable on the hub section into a position holding said attaching means in said stud, and means to hold the guide section and the hub section together.

10. An implement-tractor connection comprising the combination of a stud having a link receiving section apertured adjacent one end, a guide member having a cylindrical hub section and an outwardly flaring guide section, the latter including a cylindrical portion slidable axially on said cylindrical hub section, attaching means extending through the cylindrical hub section and the apertured portion of said stud to hold the guide member in position on the stud adjacent the link-receiving section thereof, a part of said cylindrical portion being disposed to overlie said attaching means to prevent displacement of the latter, and means to hold the guide section and the hub section together.

11. The combination set forth in claim 10, said last named means being characterized by said cylindrical section and the cooperating cylindrical portion of said guide section having registering openings and pin means insertable in said openings to hold the hub section and guide section together.

12. An implement-tractor connection comprising the combination of a stud having a link-receiving section apertured adjacent one end, a guide member having a cylindrical hub section and an outwardly flaring guide section, attaching means extending through the cylindrical hub section and the apertured portion of said stud to hold the guide member in position on the stud adjacent the link-receiving section thereof, said guide section and said hub section being integral and said guide member being apertured to provide pin-receiving means adapted to be aligned with the aperture in said stud, pin means disposable in said aligned apertures, and cross pin means extending into the aperture in said guide member to prevent displacement of said pin means.

13. An implement-tractor connection comprising the combination of a stud having a link-receiving section and an outer apertured section, guide means having an apertured hub section and a generally radially outwardly extending flared guide section, the aperture in said hub section extending transversely and adapted to be aligned with the aperture in said outer section of said stud, and means extending through the aligned apertures in said apertured hub section and said apertured stud section for holding said guide member in position.

References Cited in the file of this patent

UNITED STATES PATENTS

| | | |
|---|---|---|
| 2,673,507 | Sawyer | Mar. 30, 1954 |
| 2,674,169 | Sawyer | Apr. 6, 1954 |